(12) United States Patent
Yoshimura et al.

(10) Patent No.: US 6,893,026 B2
(45) Date of Patent: May 17, 2005

(54) BLADE ATTACHING AND DETACHING MECHANISM

(75) Inventors: Kazunobu Yoshimura, Hitachinaka (JP); Yuuichi Satou, Hitachinaka (JP); Toshihiko Tachibana, Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 154 days.

(21) Appl. No.: 10/338,674

(22) Filed: Jan. 9, 2003

(65) Prior Publication Data

US 2003/0132581 A1 Jul. 17, 2003

(30) Foreign Application Priority Data

Jan. 15, 2002 (JP) ....................................... 2002-005459

(51) Int. Cl.$^7$ .......................................... B23B 31/107
(52) U.S. Cl. ........................... 279/81; 279/29; 279/906; 30/392; 83/698.31
(58) Field of Search ............................. 279/29, 71, 76, 279/79, 80, 81, 906; 30/392–394; 83/698.11, 698.31, 699.21

(56) References Cited

U.S. PATENT DOCUMENTS

| 316,031 | A | * | 4/1885 | Haney | 403/301 |
|---|---|---|---|---|---|
| 1,179,476 | A | * | 4/1916 | Thomas | 279/44 |
| 4,106,181 | A | * | 8/1978 | Mattchen | 29/450 |
| 4,294,013 | A | * | 10/1981 | Krieg | 30/392 |
| 5,322,302 | A | * | 6/1994 | Quirijnen | 279/22 |
| 5,443,276 | A | | 8/1995 | Nasser et al. | |
| 5,575,071 | A | | 11/1996 | Phillips et al. | |
| 5,647,133 | A | | 7/1997 | Dassoulas et al. | |
| 6,112,420 | A | * | 9/2000 | Schickerling | 30/392 |
| 6,276,065 | B1 | | 8/2001 | Osada et al. | |
| 6,694,624 | B2 | * | 2/2004 | Stefanopulos et al. | 30/392 |

\* cited by examiner

Primary Examiner—Daniel W. Howell
(74) Attorney, Agent, or Firm—Sughrue Mion, PLLC

(57) ABSTRACT

A blade attachment/detachment mechanism for detachably attaching a blade to a saber saw. An end portion of the blade is formed with a blade hole. A reciprocally movable plunger has a blade attachment end portion where a slit and a stepped hole are formed. The slit extends in a longitudinal direction of the blade, and the stepped hole extends in a direction perpendicular to the slit and intersects the slit. An engagement pin is provided in the stepped hole. The engagement pin is engageable with the blade hole to fix the blade to the plunger when the blade end is inserted into the slit. For moving the engagement pin, a knob is pivotally supported to the blade attachment end portion, and a torsion spring is provided to bias the knob in a blade attaching direction. The knob has a slanted surface in engagement with the engagement pin. When the knob is pivotally moved to the blade attaching direction by the biasing force of the torsion spring, the slanted surfaces pushes the engagement pin to maintain engagement with the blade hole. When the knob is manually moved in an opposite direction, the urging force of the slanted surface toward the engagement pin is reduced. The engagement pin is also biased by a compression spring, so that the engagement pin is disengaged from the blade hole by the biasing force of the compression spring.

18 Claims, 9 Drawing Sheets

BLADE ATTACHING AND DETACHING MECHANISM

BACKGROUND OF THE INVENTION

The present invention relates to a blade attachment/detachment mechanism for a cutting bit, such as a saber saw, that is reciprocally driven by a drive motor.

Electric powered saber saws are used for cutting workpieces, such as pipes, wood, and steel materials, for building, repairing, and dismantling houses and other buildings. As is well known in the art, the saber saw has a reciprocally moving shaft, referred to as plunger hereinafter, that is driven to move reciprocally in a linear or circulation path within the casing of the saber saw. A linear saw blade is attached to the plunger and driven to move reciprocally at a position outside the casing of the saber saw in order to cut a workpiece.

Normally, the plunger moves reciprocally with a stroke of from about 20 mm at a minimum to about 32 mm at a maximum. For this reason, when actually cutting a workpiece, only a region of the blade that reciprocates with the stroke locally contacts the workpiece so that region of the blade wears down rapidly. As a result, the blade must be frequently replaced, particularly when the saber saw is used to cut through hard materials, such as steel. Also, the blade is long and thin and driven reciprocally at a high speed. Therefore, repulsion force generated during normal cutting operations may be imparted on the local blade portion to which the plunger is attached. In this case also, the blade needs to be replaced.

The blade is formed with an engagement hole and the saber saw includes a blade holder for enabling attachment and detachment of the blade. The engagement hole is formed in the end of the blade that is attached to the plunger. The blade holder includes a protrusion that can be inserted into the hole of the blade. By tightening or loosening the blade holder using a wrench, for example, the blade can be attached to or detached from the plunger. However, this mechanism is troublesome to use, which lowers efficiency of saber saw operations. Also, the operator must always have a wrench or other tool for attaching and detaching blades. Further, if the user looses the tool, he or she will be unable to attach and detach blades.

U.S. Pat. Nos. 5,443,276, 5,575,071, and 5,647,133 disclose toolless blade attaching and detaching mechanisms that enable exchanging blades without using a wrench or similar tool. The disclosed toolless blade attaching and detaching mechanism have a steel ball or a movable locking pin which is engagable with a hole in the blade. The movable locking pin has a front end projection formed into a conical shape. A lever or a rotary ring is provided in a main body of a saber saw to urge the movable locking pin or the ball toward the blade to hold the blade, and to provide a space capable of permitting the steel ball or the movable locking pin to be disengaged from the blade.

However, these conventional toolless blade attaching and detaching mechanism basically force the operator to touch the blade by the operator's finger in order to remove the blade from the engagement hole. When the blade is broken at it proximal end, a small piece of the blade will be left in a narrow space of the plunger. In such a case, it would be impossible to directly handle the blade with the finger. Therefore, it is a time-consuming operation to completely remove such a small piece remaining in the narrow space of the plunger.

The blade attaching and detaching mechanisms disclosed in the U.S. Pat. Nos. 5,443,276 and 5,647,133 include complicated parts that are exposed outside the saber saw. The exposed parts can be damaged by being pinched by or colliding with the workpiece during a sawing operation. Because the blade attaching and detaching mechanisms itself can be damaged in this way, it lacks proper durability.

SUMMARY OF THE INVENTION

It is an object of the present invention to overcome the above-described problems and to provide a saber saw blade attaching and detaching mechanism that enables the blade to be easily fixed and detached and that has proper durability.

This and other object of the present invention will be attained by an improved blade attaching and detaching mechanism for attaching a blade to a reciprocal power tool. The blade has a blade attachment end portion formed with a blade hole. The mechanism includes a plunger, an engagement member, a knob, and a first biasing member. The plunger is driven reciprocally in a lengthwise direction thereof and has a tip end portion formed with a blade insertion portion extending substantially in a reciprocal movement direction of the blade. The tip end portion is also formed with an engagement hole substantially perpendicular to the blade insertion portion. The engagement member is protrudable into and retractable from the engagement hole and is engageable with the blade hole when the blade attachment end portion of a blade is inserted into the blade insertion portion. The knob is provided at the tip portion of the plunger and is pivotally movable about a pivot axis that extends perpendicular to the lengthwise direction of the plunger. The knob has an acting surface acting on the engagement member for regulating protrusion and retraction of the engagement member into and out from the blade hole upon pivotal movement of the knob. The first biasing member is adapted for urging the knob to pivot in a direction to permit the engagement member to protrude into the blade hole.

DETAILED DESCRIPTION OF THE EMBODIMENT

Figure 1:
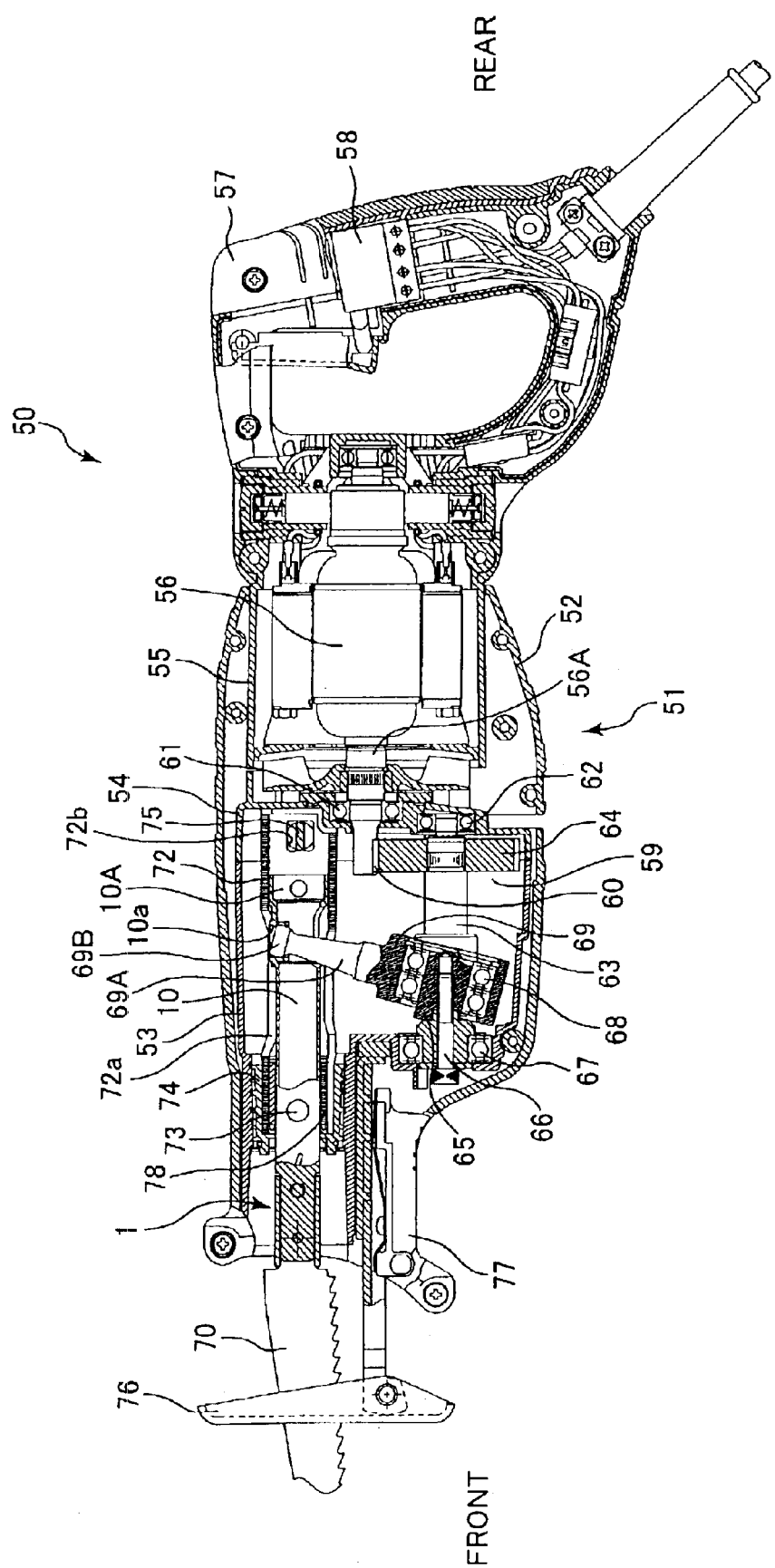
FIG. 1 is a cross-sectional view showing a saber saw including a blade attaching and detaching mechanism according to a first embodiment of the present invention.

Next, a saber saw 50 according to a first embodiment of the present invention will be described with reference to FIG. 1. The following description will be provided assuming that the left side of FIG. 1 is the forward direction and the right side of FIG. 1 is the rearward direction.

A main body 51 of the saber saw 50 provided by a front cover 52. A gear cover 53, an inner cover 54, and a motor housing 55 are disposed in this order within the front cover 52 from the forward side to the rearward side. The motor housing 55 is formed from a resin and houses a drive motor 56, which includes a motor shaft 56A. A handle 57 is connected to the rear-side end of the motor housing 55. A switch 58 for opening and closing a power supply circuit to the drive motor 56 is housed within the handle 57.

The gear cover 53 and the inner cover 54 are made from aluminum. The inner cover 54 is connected to the front end of the motor housing 55 and houses a power transmission unit (deceleration mechanism) 59. The motor shaft 56A passes through the front-end surface of the motor housing 55 and is rotatably supported on the inner cover 54 via a bearing 61. The motor shaft 56A has a tip end provided with a drive gear 60. A second shaft 63 extends parallel to the motor shaft 56A, and is rotatably supported by the inner cover 54 via a bearing 62. The second shaft 63 has a rear end provided with a driven gear 64 meshedly engaged with the drive gear 60. Thus, a deceleration gear mechanism 59 is provided. With this configuration, the rotation of the drive motor 56 is reduced by the drive gear 60 and the driven gear 64 before being transmitted to the second shaft 63.

A slanting shaft member 65 is fixed to the front-side end of the second shaft 63. The slanting shaft member 65 slants at an angle of about 14 degrees with respect to the axis of the second shaft 63. A sub shaft 66 is attached to the front-side end of the slanting shaft member 65. The axis of the sub shaft 66 is coaxially aligned with the second shaft 63. The sub shaft 66 is rotatably supported on the gear cover 53 by a bearing 67.

A reciprocal rod 69 is movably attached to the slanting shaft member 65 of the second shaft 63 via two bearings 68. The reciprocal rod 69 has an oscillating shaft 69A. A spherical section 69B is provided on a free end of the oscillating shaft 69A. The spherical section 69B of the reciprocal rod 69 is connected to an elongated plunger 10 adapted for reciprocally moving a blade 70 positioned at the front-side of the main body 51.

The plunger 10 is supported so as to be reciprocally slidable within a guide sleeve 72. The front-side end of the guide sleeve 72 is pivotally movably attached to the gear cover 53 by a bolt 73 extending in a radial direction of the guide sleeve 72. A cylindrical rubber member 74 is interposed between the gear cover 53 and the front-side end of the guide sleeve 72. The rubber member 74 prevents foreign matter from entering into the gear cover 53 while allowing pivot motion of the guide sleeve 72. A slot 72a is formed at a center section of the guide sleeve 72. The slot 72a is elongated in the axial direction of the guide sleeve 72 and allows the oscillating shaft 69A of the reciprocal rod 69 to pass through the guide sleeve 72. Also, a square through hole 72b is formed in the rear-side end of the guide sleeve 72. A freely rotatable change shaft 75 extends through the inner cover 54 and passes through the square through hole 72b. The change shaft 75 is connected to a change lever (not shown). By rotating the change lever to a predetermined angle, the pivot motion of the guide sleeve 72 about the bolt 73 can be regulated.

A bearing metal 78 is force-fitted within the front-side end of the guide sleeve 72. The plunger 10 is reciprocally and slidably provided with respect to the inner periphery of the bearing metal 78. The rear-side end of the plunger 10 has a large-diameter section 10A that can slide within a slight gap between itself and the inner peripheral surface of the guide sleeve 72. A hole 10a is formed in the large-diameter section 10A. The hole 10a extends perpendicular to the axial direction of the large-diameter portion 10A. The oscillating shaft 69A of the reciprocal rod 69 passes through the slot 72a and the spherical section 69B is rollably engaged in the hole 10a with a minute gap relative to the hole 10a. Accordingly, rotation of the slanting shaft member 65 by rotation of the second shaft 63 repeatedly switches the reciprocal rod 69 from the right-handed slant shown in FIG. 1 to a left-handed slant (not shown) so that the spherical section 69B reciprocally moves back and forth in the front-to-rear direction of the main body 51. As a result, rotational movement of the second shaft 63 is converted into reciprocal movement of the plunger 10.

Although not shown in the drawings, a rotational shaft of a swing roller (not shown) is supported in the plunger 10. The swing roller is rollably provided on an upper slanting surface of a swing rail (not shown) that is fixed to the inner cover 54 and the gear cover 53. The swing roller rolls along the slanted upper surface in association with reciprocal movement of the plunger 10 when the change shaft 75 is at the position that allows pivoting movement of the guide sleeve 72. As a result, the plunger 10 moves reciprocally while swinging, thereby enhancing the ability of the tool to cut into the workpiece. The mechanism for reciprocally moving while pivoting the plunger 10 and the mechanism for selectively preventing the pivoting action of the plunger 10 are described in a commonly assigned U.S. Pat. No. 6,276,065, so further description is omitted.

A base 76 is attached to the front-end side of the gear cover 53 through a fixing lever 77. The base 76 is adapted for stabilizing the main body 51 with respect to the workpiece during cutting operations. A blade attachment/detachment mechanism 1 is provided at the front-end side of the plunger 10. The blade attachment/detachment mechanism 1 is adapted for attaching the blade 70 to the plunger 10 and detaching the blade 70 from the plunger 10. The blade attachment/detachment mechanism 1 is provided at a position that enables it to protrude outward and retracted inward with respect to a front-end opening in the front cover 52.

Figure 2:
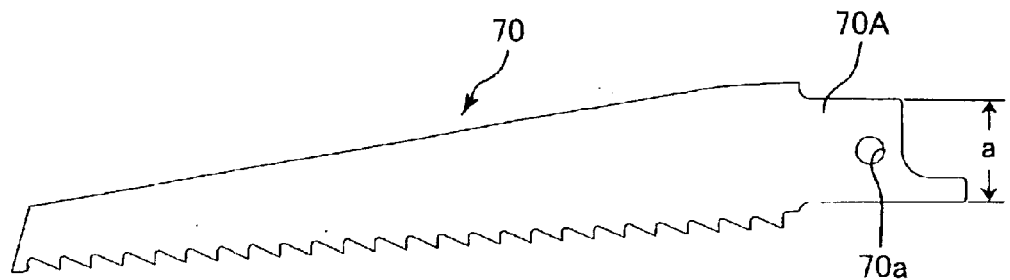
FIG. 2 is a side view showing an example of a blade used in the blade attaching and detaching mechanism of the first embodiment.
Figure 3:
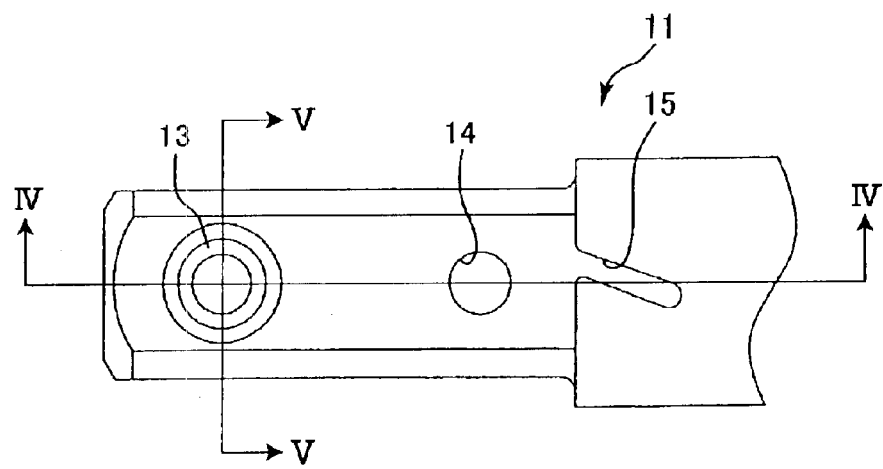
FIG. 3 is a side view showing a blade attachment end portion of a plunger of the attaching and detaching mechanism according to a first embodiment.
Figure 4:
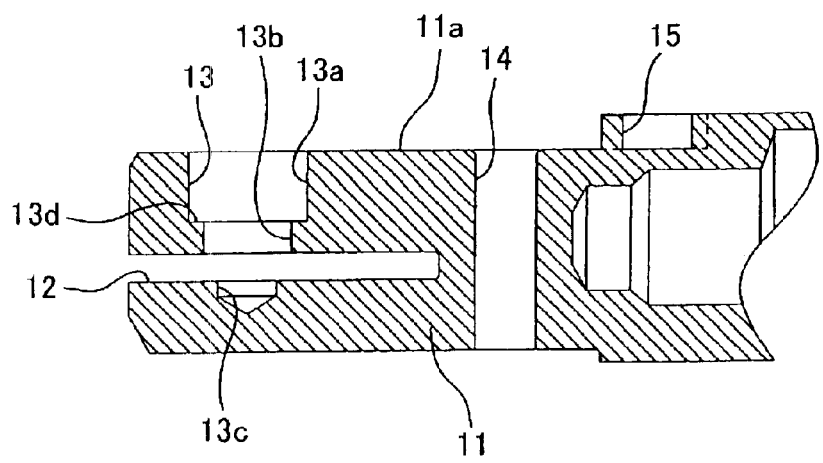
FIG. 4 is a cross-sectional view taken along line IV—IV of FIG. 3.
Figure 5:
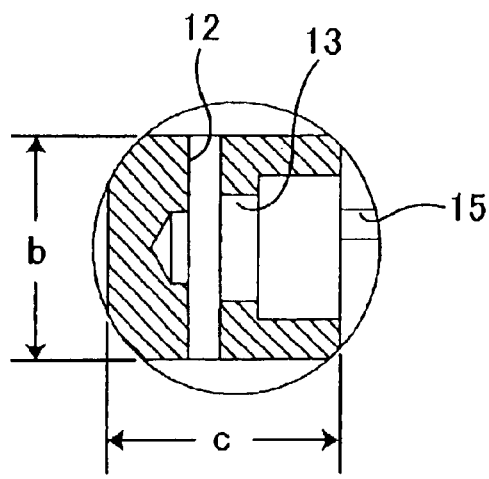
FIG. 5 is a cross-sectional view taken along line V—V of FIG. 3.

As shown in FIG. 2, the rear end portion of the blade 70 includes an attachment end portion 70A, which has upper and lower surfaces that extend parallel to each other by a height "a". An engagement hole 70a is formed through the attachment end portion 70A. The attachment end portion 70a is detachably attached to a blade attachment end portion 11 at the front end portion of the plunger 10. The blade attachment end portion 11 is shown in FIGS. 3 to 5.

The blade attachment end portion 11 of the plunger 10 has a substantially rectangular shape in cross section with a height b and a width c. A slit 12 extends in the lengthwise direction of the blade 70 from the front-side tip of the plunger 10. The slit 12 is for insertion of the attachment end 70A of the blade 70. As shown in FIG. 5, the slit 12 is formed to penetrate completely vertically through the blade attachment end portion 11 of the plunger 10. A stepped hole 13 is formed in the blade attachment end portion 11 so as to intersect with the slit 12 at a right angle. The stepped hole 13 extends from the outer peripheral surface of the blade attachment end portion 11 in a direction perpendicular to the side surface of the blade 70 to a point beyond the slit 12. The stepped hole 13 is formed at a position so as to be coaxial with the engagement hole 70a of the blade 70 when the blade 70 is completely inserted within the slit 12. As shown in FIG. 4, the stepped hole 13 includes a large-diameter section 13a, a mid-diameter section 13b, and a small-diameter section 13c. The large-diameter section 13a is positioned to the outside and open to the outer peripheral surface of the blade attachment end portion 11. The mid-diameter section 13b is disposed to the inside of the large-diameter section 13a and is open to the slit 12. The small-diameter section 13c is formed on the opposite side of the mid-diameter section 13b with respect to the slit 12. The large-diameter section 13a, the mid-diameter section 13b, and the small-diameter section 13c are all coaxially aligned with each other. It should be noted that the tip of the small-diameter section 13c is formed with a substantially triangular shape when viewed in cross section as in FIG. 4. The triangular shape is formed by the bit tip when stepped hole 13 is drilled in the blade attachment end portion 11. Further, a through hole 14 is formed behind the slit 12 in a direction that extends parallel with the axis of the stepped hole 13. The height b of the blade attachment end portion 11 of the plunger 10 is slightly smaller than the height a of the attachment end 70A of the blade 70. Also, the rear-side end of the substantially cross-sectionals square portion is formed substantially circular as viewed in cross section. A groove 15 is formed in the substantially cross-sectionally circular section. The groove 15 is opened at one end near the border between the substantially cross-sectionally square portion and the substantially cross-sectionally circular section.

FIGS. 6 to 9 show the blade attachment/detachment mechanism 1 with the blade 70 fixed to the plunger 10. The blade attachment/detachment mechanism 1 includes the blade attachment end portion 11, an engagement pin 16, a torsion spring 17, a compression coil spring 18, a knob 20, a blade holder 30, and a tightening bolt 40.

The engagement pin 16 is provided so as to be capable of protruding into and retracting out from the stepped hole 13 for engaging with and separating from the engagement hole 70a, which is formed in the attachment end 70A of the blade 70 inserted into the slit 12. The engagement pin 16 includes a first cylindrical section 16A, a second cylindrical section 16B, and a third cylindrical section 16C in this order. A diameter of the second cylindrical section 16B is larger than that of the first cylindrical section 16A, and is substantially equal to an inner diameter of the mid-diameter section 13b of the stepped hole 13. A diameter of the third cylindrical section 16C is larger than that of the second cylindrical section 16B, and is substantially equal to an inner diameter of the large-diameter section 13a of the stepped hole 13. The third cylindrical section 16C is formed with an abutment portion 16D. The abutment portion 16D has a slanting surface in direct contact with a knob 20 in a manner to be described later. The first cylindrical section 16A has a size that enables it to protrude from and retract into the hole 70a of the blade 70. Further, the first cylindrical section 16A has an axial length capable of being also positioned into the small-diameter section 13c of the stepped hole 13 depending on a thickness of an applied blade 70. The bordering surface between the first cylindrical section 16A and the second cylindrical section 16B forms a step surface 16E for pressing the side surface of the attachment end 70A of the blade 70 when the engagement pin 16 is moved into the stepped hole 13. The compression coil spring 18 is disposed within the large-diameter section 13a and around the periphery of the second cylindrical section 16B. One end of the compression coil spring 18 is seated on a step surface 13d, which, as shown in FIG. 4, is the border surface between the large-diameter section 13a and the mid-diameter section 13b of the stepped hole 13. The other end of the compression coil spring 18 is seated on a step surface between the second cylindrical section 16B and the third cylindrical section 16C of the engagement pin 16. Accordingly, the compression coil spring 18 urges the engagement pin 16 in the direction to pull the engagement pin 16 out from the stepped hole 13, that is in the direction for disengaging the first cylindrical section 16A from the blade engagement hole 70a.

Figure 6:
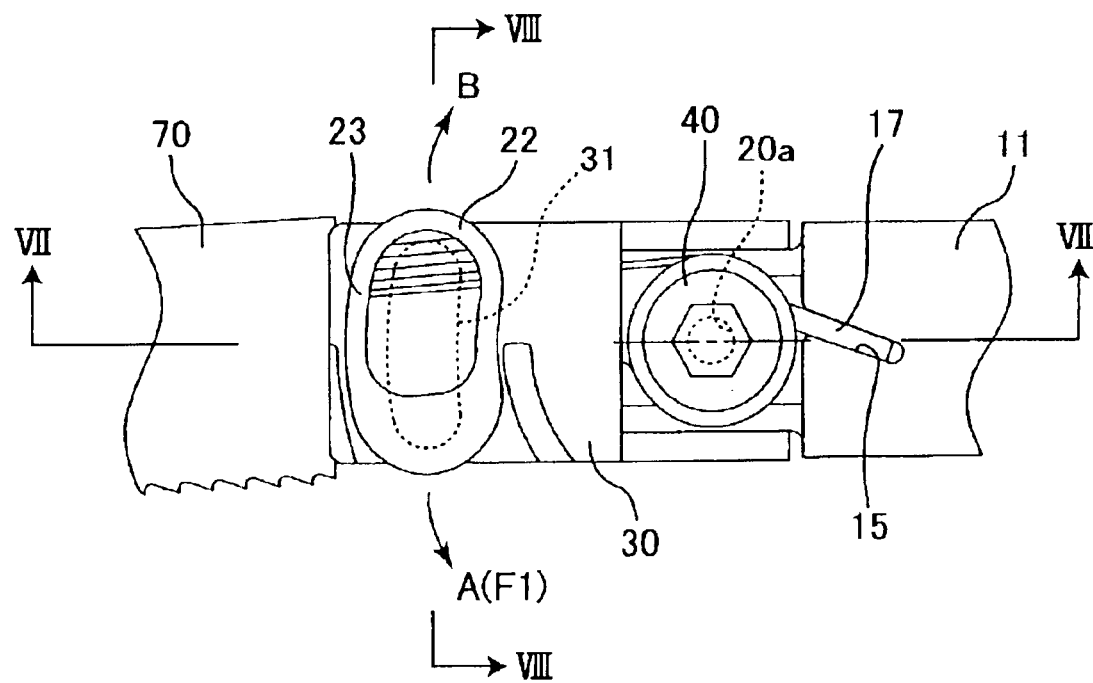
FIG. 6 is a partial side view showing the blade of FIG. 2 fixed to the attaching and detaching mechanism according to the first embedment.

The knob 20 is provided pivotable around an imaginary pivoting axis 14a, which extends perpendicular to the lengthwise direction of the plunger 10. In association with this pivoting action, the knob 20 changes pressing force applied to the abutment portion 16D of the engagement pin 16 and regulates protruding and retracting action of the engagement pin 16 into and out from the engagement hole 70a. The pivoting axis 14a is coaxial with the through hole 14. The tightening bolt 40 is inserted through the through hole 14. The knob 20 is formed from a high hardness material such as steel. The knob 20 is positioned externally of the blade attachment end portion 11, and is pivotally movable in a direction substantially perpendicular to the reciprocating direction of the plunger 10. A pivoting arm length "p" (FIG. 7) of the knob 20 is greater than the height "b" of the blade attachment end portion 11. Further, the pivot axis 14a of the knob 20 is positioned at an approximately vertical center of the blade attachment end portion 11. In other words, as shown in FIG. 6, the tightening bolt 40 is positioned symmetrically with respect to a cross-sectional line VII—VII. The knob 20 includes a pivoting base 20A, a pivoting manipulation portion 20B, and an engagement pin pressing portion 20C. A bolt through hole 20a into which the tightening bolt 40 is inserted is formed in the pivoting base 20A. A torsion spring mounting chamber 20b is defined between the pivoting base 20A and the blade attachment end portion 11 of the plunger 10. That is, the torsion spring 17 is covered by the knob 20. In other words, the torsion spring 17 is positioned inside of the knob 20 in a direction perpendicular to the lengthwise direction of the plunger 10.

The surface of the engagement pin pressing portion 20C in confrontation with the blade attachment end portion 11 defines a slanted surface 20c. The slanted surface 20c is constantly abutting against the abutment portion 16D of the engagement pin 16. The pivoting manipulation portion 20B includes a protrusion 21 protruding in a direction away from the side surface of the blade attachment end portion 11 of the plunger 10 and parallel with the pivoting axis 14a. A distance q between the pivoting axis 14a and a position where the abutment portion 16D abuts the slanting surface 20c, which is shorter than a distance p between the pivoting axis 14a and the axial center of the protrusion 21.

The torsion spring 17 is disposed around the shaft of the tightening bolt 40. One end of the torsion spring 17 is engaged in the groove 15 of the blade attachment end portion 11 of the plunger 10. The other end of the torsion spring 17 is engaged in a spring engagement groove 20d of the knob 20. The torsion spring 17 urges the knob 20 to pivot in the direction indicated by arrow B in FIG. 8 to increase the pressing force applied to the abutment portion 16D of the slanting surface 20c, thereby urging the engagement pin 16 in the direction for engaging the first cylindrical section 16A of the engagement pin 16 into the engagement hole 70a of the blade 70. Also, the urging force of the torsion spring 17 is set larger than the urging force of the compression coil spring 18. When the user pivots the pivoting manipulation portion 20B about the tightening bolt 40 against the urging force of the torsion spring 17, the slanting surface 20c moves with respect to the abutment portion 16D so that the urging force applied by the slanting surface 20c to the abutment portion 16D changes so that the engagement pin 16, which is urged by the compression coil spring 18, can be displaced in its axial direction. During cutting operations, the resilient force of the torsion spring 17 is applied in a direction substantially perpendicular to the reciprocal movement direction of the plunger 10. Therefore, acceleration generated by the high-speed reciprocal movement of the plunger 10 during cutting operations is not severely imparted on the torsion spring, so that a stable resilient force can be implemented to the knob 20 so as to provide stable pressure to the engagement pin 16 from the knob 20.

The blade holder 30 mainly serves as a support for the vertical cutting load of the blade 70. That is, an operator presses down on the main body 51 while cutting a workpiece, so that a vertical load is generated on the blade 70. Therefore, the blade holder 30 needs to support the vertical load at the attachment portion 70A of the blade 70. Also, as described above the blade 70 not only moves reciprocally in its lengthwise direction, but also pivots slightly to increase cutting efficiency. This increases the vertical load, so the load must be supported. Also, the blade attachment/detachment mechanism 1 is located at the position nearest to the workpiece. Therefore the blade holder 30 functions to protect the blade attachment/detachment mechanism 1 from dangers such as colliding with or thrusting into the workpiece during cutting operations and also functions to prevent foreign matter such as saw dust from the workpiece from entering into the blade attachment/detachment mechanism 1.

Figure 8:
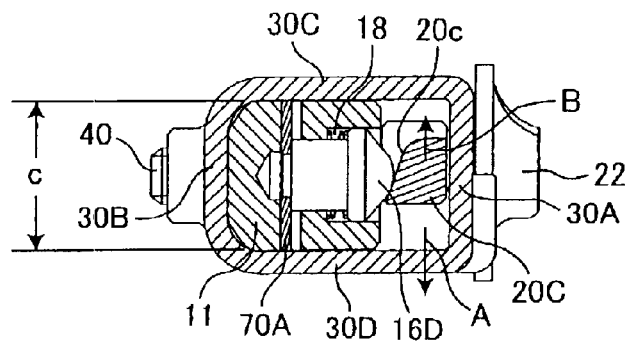
FIG. 8 is a cross-sectional view taken along line VIII—VIII of FIG. 6.
Figure 9:
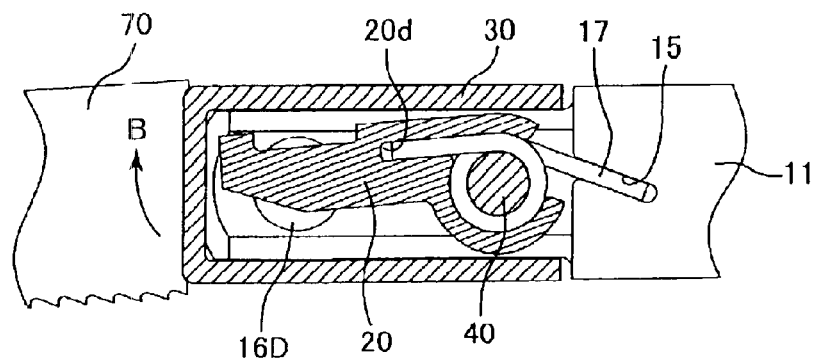
FIG. 9 is a cross-sectional view taken along line IX—IX of FIG. 7.

The blade holder 30 is formed from a high hardness material into a shape that matches the outer contours of the outer periphery of the knob 20 and the blade attachment end portion 11 of the plunger 10. An arcuate slot 31 is formed through a side wall 30A of the blade holder 30. The protrusion 21 of the knob 20 protrudes through the arcuate slot 31 so that the arcuate slot 31 regulates the pivoting ranges of the knob 20. A female screw thread 32 is formed in a side wall 30B positioned at opposite side of the side wall 30A. The female screw thread 32 is threadingly engaged with the tightening bolt 40. As a result, the protrusion 21 is urged by the torsion spring 17 in the direction indicated by arrow B of FIG. 6 into abutment with one edge of the arcuate slot 31 as shown in FIG. 6. On the other hand, the protrusion 21 can be manipulated to pivot in the direction indicated by arrow A in FIG. 6 until it abuts the other edge of the arcuate slot 31 against the biasing force of the torsion spring 17. Also, all of the components can be assembled to the plunger 10 by abutting the step between the head and shaft of the tightening bolt 40 against the pivoting base 20A of the knob 20 and screwing the male screw thread at the tip of the tightening bolt 40 into the female screw thread 32 of the blade holder 30. Said differently, assembly is possible using the single tightening bolt 40. In the assembled condition, each flat section at the inner surface of the blade holder 30 and each flat section at the outer surface of the blade attachment end portion 11 of the plunger 10 abut against each other at a plurality of positions with mutually different angles. Also, the tightening bolt 40 is fixed to the blade attachment end portion 11 and the blade holder 30. Therefore, the blade holder 30 is prevented from moving in the axial direction and from rotating with respect to the plunger 10. Further, as shown in FIG. 8, the inner surfaces of the upper wall 30C and the lower wall 30D are separated by a distance c. The distance c is equivalent to the distance a (FIG. 2) between the upper and lower surfaces of the attachment portion 70A of the blade 70. Accordingly, the vertical load applied to the blade 70 is properly supported on the blade holder 30.

A detachable knob cover 22 covers the protrusion 21 of the knob 20. The knob cover 22 provides a thermal conductivity lower than that of the knob 20 and is formed from a resilient material or a deformable resin. Also, the knob cover 22 is provided with a flange 23 for covering the arcuate slot 31. Because the external shape of the knob cover 22 is larger than that of the protrusion 21, the knob 20 is easier to operate than if the user had to grasp the protrusion directly. Also, although frictional heat of the blade 70 during cutting operations is transmitted to the metal knob 20, the operator will never directly touch the heated up knob 20 when manipulating the knob 20 because the knob cover 22, which has a low thermal conductivity, covers the protrusion 21. Further, the flange 23 prevents saw dust, dirt and the like from entering into the arcuate slot 31. Also, because the knob cover 22 is detachably attached to the protrusion 21 because of the resilient material or deformable material of the knob cover 22, the inside of the arcuate slot 31 can be cleaned by removing the knob cover 22 from the protrusion 21. Further, because the overall size of the knob cover 22 is increased by the flange 23, the danger of the user contacting a heated up component is reduced even more.

Figure 7:
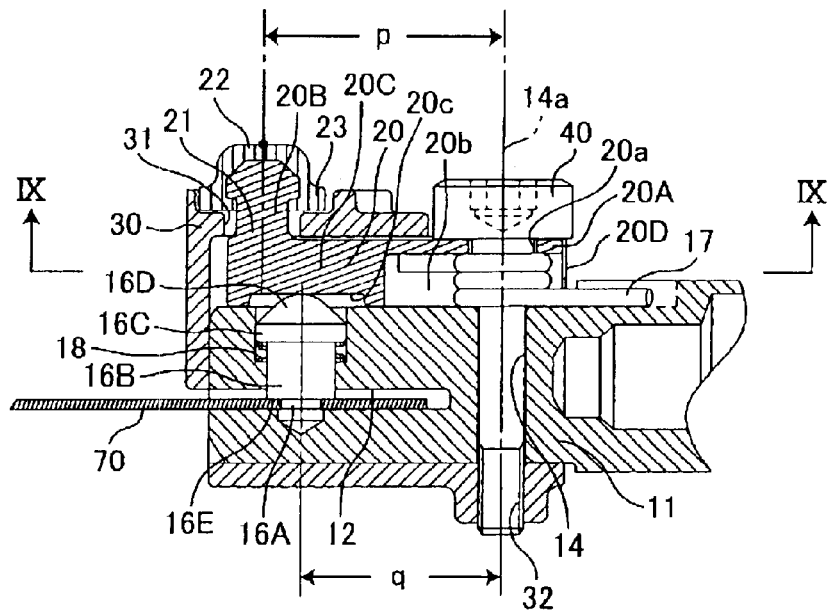
FIG. 7 is a cross-sectional view taken along line VII—VII of FIG. 6.
Figure 10A:
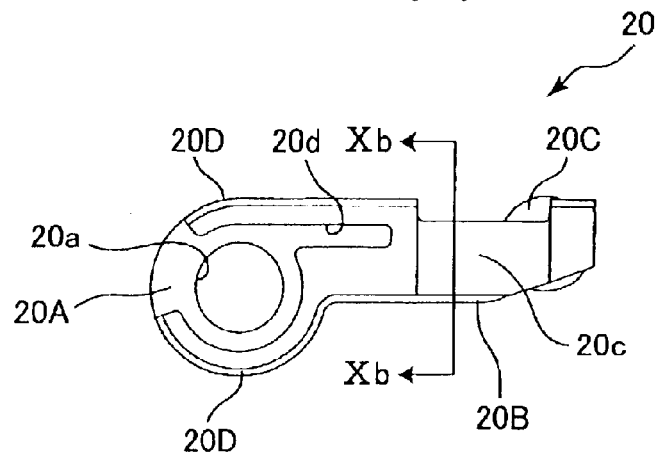
FIG. 10(A) is a bottom view showing a knob, which is a component of the blade attaching and detaching mechanism according to the first embodiment.
Figure 10B:
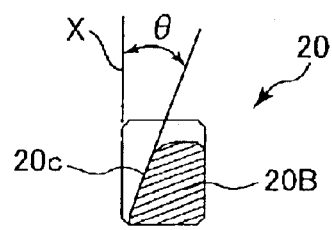
FIG. 10(B) is a cross-sectional view taken along line Xb—Xb of FIG. 10(A)
Figure 11:
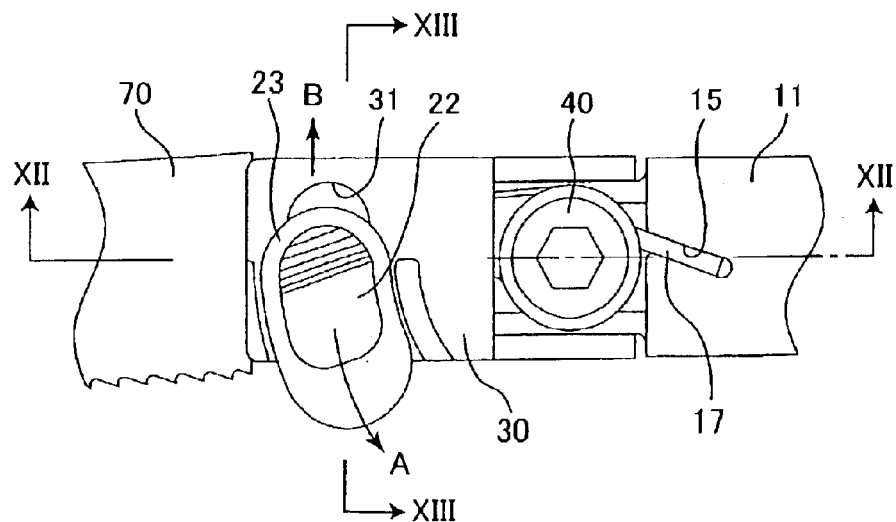
FIG. 11 is a side view showing the blade attaching and detaching mechanism according to the first embodiment in a condition for detaching the blade.
Figure 12:
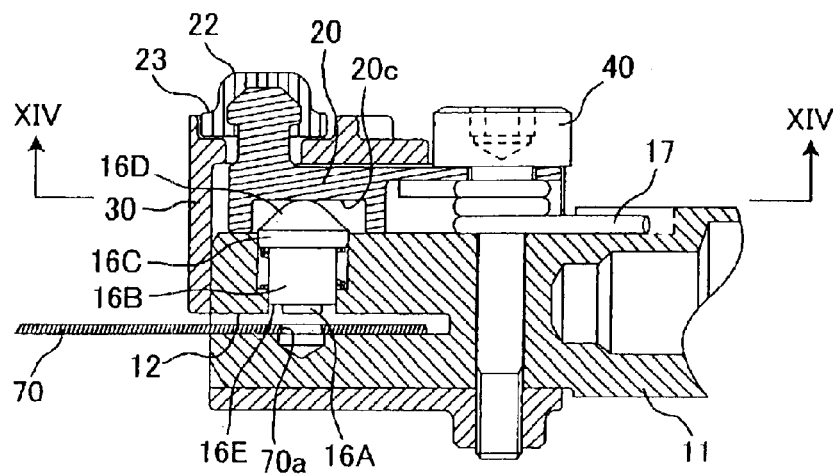
FIG. 12 is a cross-sectional view taken along line XII—XII of FIG. 11.
Figure 13:
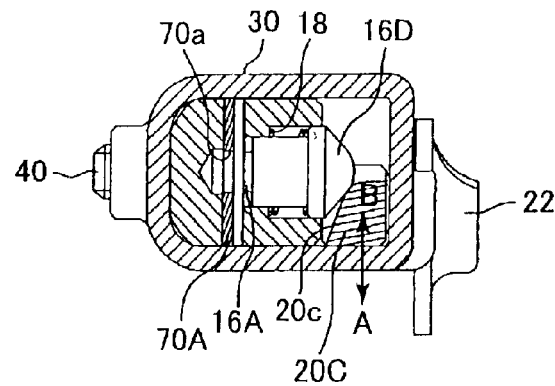
FIG. 13 is a cross-sectional view taken along line XIII—XIII of FIG. 11.
Figure 14:
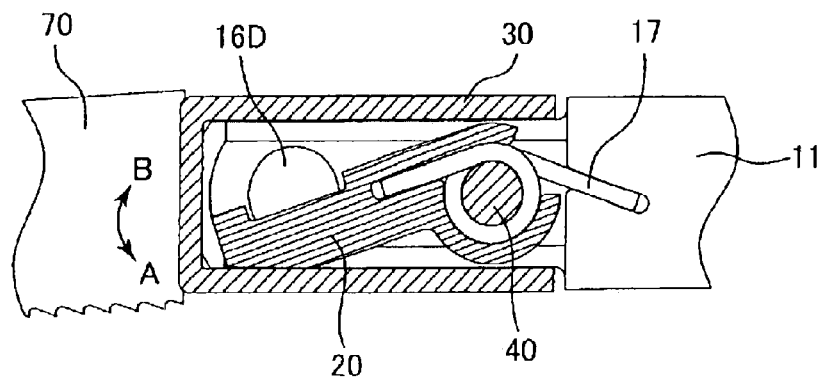
FIG. 14 is a cross-sectional view taken along line XIV—XIV of FIG. 12.

FIG. 10(A) is a plan view showing the knob 20 from the side of the slanted surface 20c. The knob 20 is formed with a rib 20D that extends at a right angle from the flat surfaced section that abuts the head of the tightening bolt 40. This forms the torsion spring mounting chamber 20b (FIG. 7). The spring engagement groove 20d is carved into the flat surfaced section. The slanted surface 20c forms an angle θ with respect to a reference line X, which extends parallel to the side surface of the attachment portion 70A of the blade 70. Because the slanted surface 20c abuts the engagement pin 16 of the knob 20, wedge effect can be provided so that pressing force can be more reliably applied to the engagement pin 16 by moving the slanted surface 20c upon pivoting the knob 20. By appropriately changing the slant angle θ of the slanting surface 20c, the amount that the engagement pin 16 is displaced by a certain pivoting amount of the engagement pin 16 can be easily changed.

Next, operation of the attachment/detachment mechanism 1 will be described for the attachment/detachment of the blade 70 with respect to the plunger 10. It should be noted that the operator cannot access to the knob cover 22 with his/her fingers while saber saw 50 is in the condition shown in FIG. 1, because the knob cover 22 is located within the main body 51. In this case, the operator needs to merely manipulate the switch 58 to drive the plunger 10 until the knob cover 22 is positioned outside the main body 51. Also, even if the knob cover 22 is not located completely to the outside of the main body 51, if the oscillating shaft 69A of the reciprocal rod 69 tilts forward in the opposite direction from that shown in FIG. 1, then the blade attachment/detachment mechanism 1 can be pulled forward by grasping the blade 70 and moving the blade 70 forward.

While the blade 70 is not attached to the blade attachment/detachment mechanism 1, the urging force of the torsion spring 17 pushes the first cylindrical section 16A at the front tip of the engagement pin 16 into the slit 12 of the blade attachment end portion 11 of the plunger 10. Therefore, the attachment end 70A of the blade 70 cannot be inserted into the slit 12 to the position where a new blade 70 can be fixed. However, by pivotally moving the knob cover 22 in the direction indicated by arrow A in FIG. 6, the knob 20 pivots about the pivoting axis 14a of the through hole 14 of the blade attachment end portion 11 of the plunger 10 against the urging force of the torsion spring 17 until the protrusion 21 moves within the arcuate slot 31 into abutment with the edge of the arcuate slot 31. This pivoting action moves the slanting surface 20c of the knob 20 with respect to the abutment portion 16D of the engagement pin 16 in the direction indicated by arrow A of FIG. 8. Therefore, the pressure applied by the knob 20 against the engagement pin 16 gradually decreases. Because urging force of the compression coil spring 18 constantly applies the engagement pin 16 with a force to move the engagement pin 16 out of the slit 12, the engagement pin 16 pulls out from the slit 12 to outside of the blade attachment end portion 11 while the abutment portion 16D of the engagement pin 16 contacts the slanting surface of the knob 20.

Because the distance p is set larger than the distance q as shown in FIG. 7, a relatively large force is applied to the engagement pin 16 when the user pivots the knob cover 22 in the direction A. That is, provided that load F1 is applied in the direction of arrow A to the knob cover 22 at the distance p from the pivoting axis 14a of the through hole 14, and a force of load F2 is applied to the axis of the engagement pin 16, which is located the distance q from the shaft 14d. According to the principle of levers, the distances p and q and the forces F1 and F2 are related as follows:

$$F1 \times p = F2 \times q.$$

Solving for the load F2:

$$F2 = p/q \times F1.$$

Because the distance p is greater than the distance q, it can be understood that the load F1 on the knob cover 22 will be less than the load F2 applied to the engagement pin 16. That is, a greater force F2 can be applied to the engagement pin 16 with the application of a lesser force F1 to the knob cover 22. This enhances operative ease of the device.

FIGS. 11 to 14 show the condition when the knob 20 reaches the pivoting limit in the direction of arrow A. In this condition the first cylindrical section 16A of the engagement pin 16 is fully retracted out from the slit 12 so that a new blade 70 can be mounted.

Next, the operator inserts the attachment end 70a of a new blade 70 into the slit 12 while maintaining the knob 20 at the pivot limit in the direction of arrow A against the urging force of the torsion spring 17. The rear-side end of the attachment end 70A will not hit the first cylindrical section 16A because the first cylindrical section 16A does not protrude into the slit 12 at this time. After the blade 70 is inserted and the operator releases the knob cover 22, then the knob 20 automatically pivots in the direction of arrow B shown in FIGS. 11 and 14 under the urging force of the torsion spring 17. In association with this pivoting action, the slanting surface 20c of the knob 20 moves in the direction indicated by arrow B in FIG. 13 so that the engagement pin 16 is pressed toward the slit 12 following the axial direction of the stepped hole 13. The first cylindrical section 16A of the engagement pin 16 is inserted into the engagement hole 70a of the blade 70. Simultaneously with this, the stepped surface 16E presses against the side surface of the attachment end 70A of the blade 70 so that as shown in FIGS. 7 and 8 the attachment end 70A is sandwiched between one wall of the slit 12 and the stepped surface 16E. The compression force of the compression coil spring 18 need merely be sufficient for moving the small engagement pin 16 in its axial direction and so can be set sufficiently smaller than the resilient force of the torsion spring 17. It should be noted that according to FIGS. 7 and 12, the width of the slit 12 is larger than the thickness of the attachment end of the blade 70. This forms a gap that enables blades 70 of various thicknesses to be mounted. When a thick blade is mounted, the tip of the first cylindrical section 16A will only engage to partway through the engagement hole 70a of the blade. However, even thick blades can be reliably fixed in place as long as the engagement relationship between the hole 70a and the first cylindrical section 16A and the above-described sandwiching relationship are provided.

When a mounted blade 70 is to be removed, the operator manipulates the knob cover 22 in the same manner as when mounting a blade to pivot in the direction indicated by arrow A in FIG. 6. As a result, the pressure applied to the engagement pin 16 by the knob 20 is released so that the urging force of the compression coil spring 18 moves the engagement pin 16 out from the slit 12 until the first cylindrical section 16A of the engagement pin 16 pulls out from the engagement hole 70a of the attachment end of the blade 70 and the blade 70 can be removed. In this way, the compression coil spring 18 is provided in the stepped hole 13 for urging the engagement pin 16 to retract away from the slit 12 so that the engagement pin 16 can be automatically disengaged from the engagement hole 70a when the blade 70 is to be detached. Therefore, by merely tilting the tip of the plunger 10 downward, the blade 70 or fragments of a broken blade will simply fall out from the slit 12 by gravity. Therefore, blade and fragments removal can be easily performed.

Figure 15A:
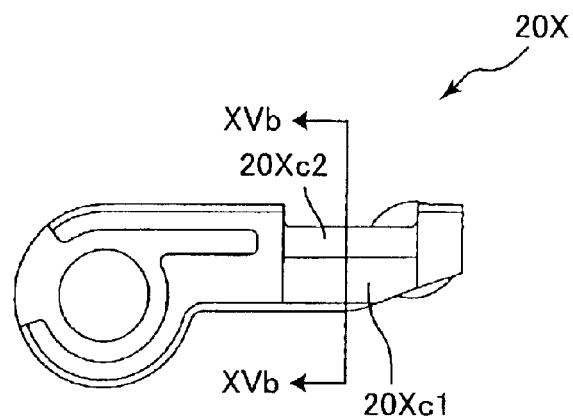
FIG. 15(A) is a bottom view showing a knob, which is a component of the blade attaching and detaching mechanism according to a modification to the first embodiment.
Figure 15B:
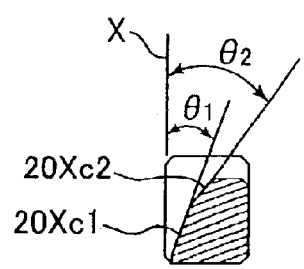
FIG. 15(B) is a cross-sectional view taken along line XVb—XVb of FIG. 15(A)
Figure 16:
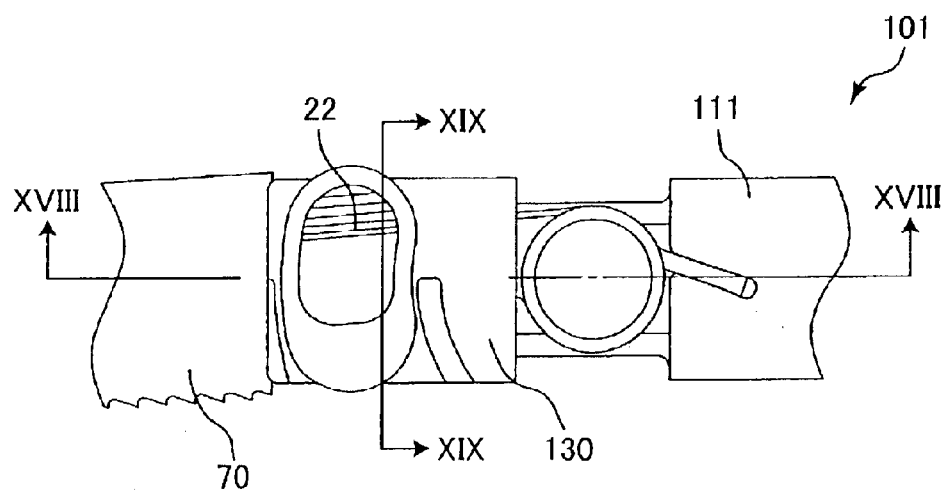
FIG. 16 is a side view showing a blade attaching and detaching mechanism according to a second embodiment of the present invention.
Figure 17:
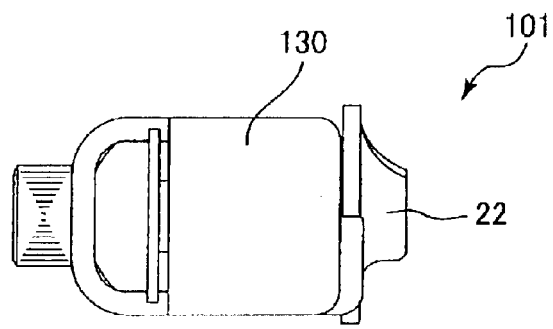
FIG. 17 is a right side view of FIG. 16.
Figure 18:
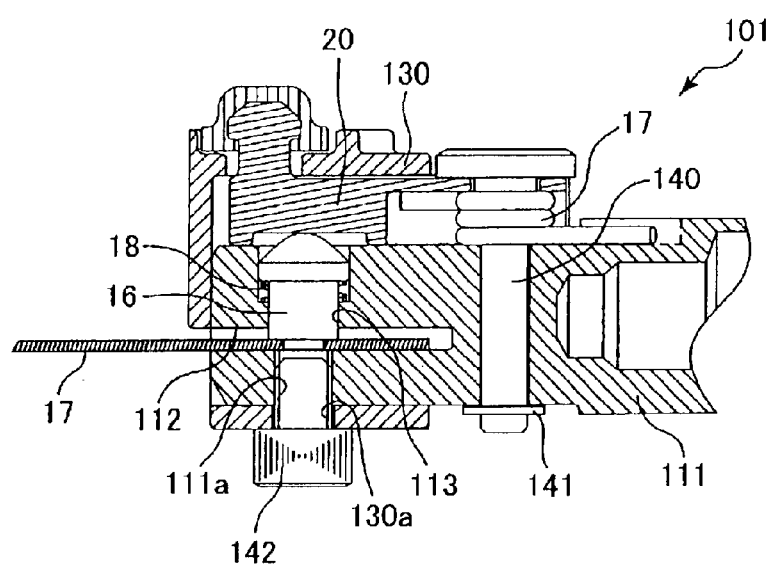
FIG. 18 is a cross-sectional view taken along line XVIII—XVIII of FIG. 16.
Figure 19:
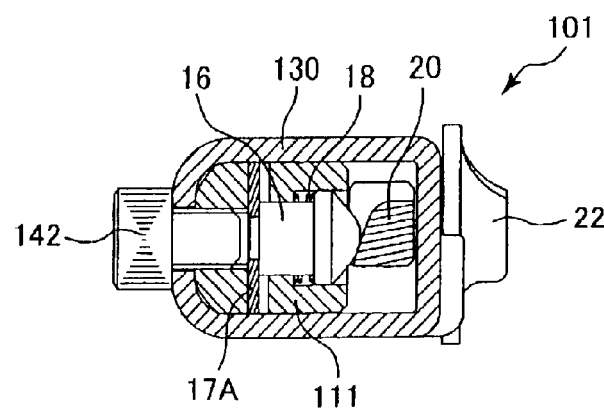
FIG. 19 is a cross-sectional view taken along line XIX—XIX of FIG. 16.

Next, a modification of the first embodiment will be described with reference to FIGS. 15(A) and 15(B). A knob 20X shown in FIG. 15 is the same as the knob 20 of the first embodiment with the exception of the slanted surface. The knob 15X is formed with a plurality (two in the present modification) of slanted surfaces 20Xc1, 20Xc2 formed next to each other. The slanted surfaces 20Xc1, 20Xc2 are for abutting the abutment portion 16D of the engagement pin 16. The first slanted surface 20Xc1 forms an angle $\theta 1$ with respect to the reference line X, which is parallel with the side surface of the attachment end 70A of the blade 70. The second side surface 20Xc2 forms an angle $\theta 2$ with respect to the reference line X. The angle $\theta 2$ is larger than the angle $\theta 1$.

Because of the slanted surfaces 20Xc1, 20Xc2 with different angles, the spring load of the torsion spring 17 can be reduced when the blade 70 is fixed using the smaller-angled slanted surface 20Xc1. In this case, the smaller angled slanted surface 20Xc1 can effectively press the engagement pin 16 to ensure fixing of the blade end portion 70A to the blade attachment end portion 11. Also, in case where the fixing of the blade end 70A to the blade attachment end portion 11 is not necessitated, the larger-angled slanted surface 20Xc2 operates on the engagement pin 16 to retract the engagement pin 16 by a greater moving stroke even when the knob 20 is only pivoted by a small amount, thereby enhancing ease of use. Also, a curved surface or a surface with a plurality of surfaces with different angles can be provided instead of the two slanted surfaces for modifying axial moving manner of the engagement pin 16.

Next, a blade attachment/detachment mechanism 101 according to a second embodiment of the present invention will be described with reference to FIGS. 16 to 19. In the first embodiment, the single tightening bolt 40 both fixes the blade attachment end portion 11 to the blade holder 30 and pivotally supports the knob 20. This configuration contributes to reduction in the number of required parts. In the second embodiment, a pin 140, which corresponds to the tightening bolt 40 of the first embodiment, functions only as the pivoting shaft of a knob 120. The torsion spring 17 is coaxially supported on the pin 140 in the same manner as in the first embodiment. The pin 140 passes through a blade attachment end portion 111 of the plunger. An annular groove is formed in the tip of the pin 140, and a stop ring 141 is fitted into the annular groove, thereby fixing the pin 140 to the blade attachment end portion 111. A bolt 142 is provided separate from the pin 140. A female screw thread 130a is formed in the blade holder 130 and a female screw thread 111a is formed in the blade attachment end portion 111 of the plunger. The female screw threads 130a, 111a are coaxial with the stepped hole 113, and are threadingly engaged with the bolt 142. The blade holder 130 is fixed to the blade attachment end portion 111 by screwing the bolt 142 into the female screw threads 130a, 111a.

Figure 20:
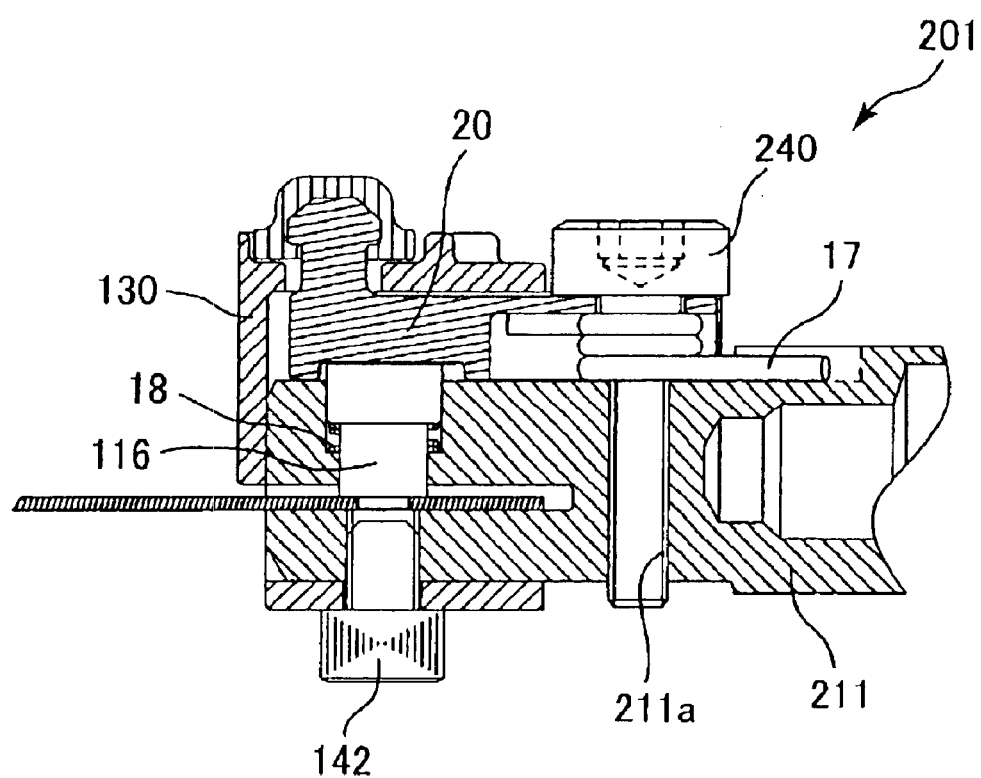
FIG. 20 is a cross-sectional view that corresponds to FIGS. 7 and 18, showing a blade attaching and detaching mechanism according to a third embodiment of the present invention.
Figure 21:
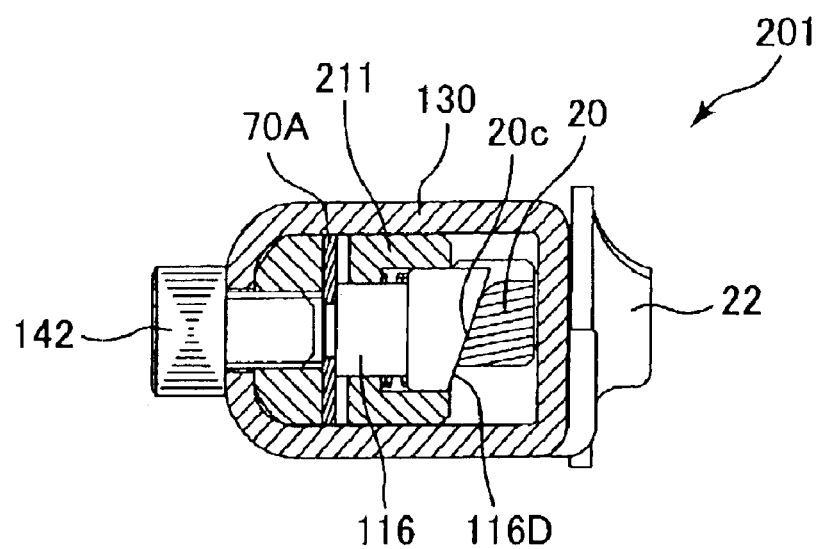
FIG. 21 is a cross-sectional view that corresponds to FIGS. 8 and 19, showing the blade attaching and detaching mechanism according to the third embodiment of the present invention.

Next a blade attachment/detachment mechanism 201 according to a third embodiment of the present invention will be described with reference to FIGS. 20 and 21. In the third embodiment, the blade holder 130 is fixed onto a blade attachment end portion 211 of the plunger by the bolt 142 in the same manner as in the second embodiment. However, the third embodiment differs from the second embodiment in that a female screw thread 211a is formed through the blade attachment end portion 211 and a bolt 240 is screwed into the female screw thread 211a instead of providing the pin 140 as in the second embodiment. With this configuration, the stop ring 141 of the second embodiment can be dispensed with. Further, the overall abutment surface of the abutment portion 116D of an engagement pin 116 is formed on a surface with the same angle as the angle of slant of the slanted surface 20c of the knob 20. Therefore, the slanted surface 20c of the knob 20 can be brought into surface contact with the slanted surface 116D of the pin 116. These large contact surfaces stabilize operations and prevents local friction.

While the invention has been described in detail with reference to the specific embodiments thereof, it would be apparent to those skilled in the art that various changes and modifications may be made therein without departing from the spirit and scope of the invention. For example, the slanted surface 116D of the third embodiment can be used on the engagement pin 16 of the first and second embodiments.

Further, in the above described embodiments, each of the blade attachment end portions 11, 111, 211 is provided by an integral member where the slits 12 or 112 is formed. However, the attachment end portions could be made from a plurality of components and the equivalent slit can be provided when the components are assembled together.

Further, in the above described embodiments the distance p between the pivoting axis 14a and the axis of the protrusion 21 is longer than the distance q between the pivot axis and the point where the knob 20 operates on the engagement pin 16. However, the distances p and q could be made the same as long as operation of the blade attachment/detachment mechanism can be maintained without lowering the operability of the knob.

What is claimed is:

1. A blade attaching and detaching mechanism for attaching a blade to a reciprocal power tool, the blade having a blade attachment end portion formed with a blade hole, the mechanism comprising:

a plunger driven reciprocally in a lengthwise direction thereof and having a tip end portion formed with a blade insertion portion extending substantially in a reciprocal movement direction of the blade and an engagement hole substantially perpendicular to the blade insertion portion;

an engagement member protrudable into and retractable from the engagement hole and engageable with the blade hole when the blade attachment end portion of a blade is inserted into the blade insertion portion;

a knob provided at the tip portion of the plunger and pivotally movable about a pivot axis that extends perpendicular to the lengthwise direction of the plunger, the knob having an acting surface acting on the engagement member for regulating protrusion and retraction of the engagement member into and out from the blade hole upon pivotal movement of the knob; and a first biasing member for urging the knob to pivot in a direction to permit the engagement member to protrude into the blade hole.

2. The blade attachment/detachment mechanism as claimed in claim 1, wherein the acting surface of the knob is movable relative to the engagement member in the direction substantially perpendicular to the reciprocally moving direction of the plunger upon pivotal movement of the knob.

3. The blade attachment/detachment mechanism as claimed in claim 1, wherein the blade insertion portion is defined by a slit that extends from a tip end of the plunger in the lengthwise direction of the plunger and that penetrates vertically through the plunger for providing an upper slit opening and a lower slit opening.

4. The blade attachment/detachment mechanism as claimed in claim 1, further comprising a second biasing member for urging the engagement member in a direction for retracting the engagement member from the blade hole, the second biasing member providing a biasing force smaller than that of the first biasing member.

5. The blade attachment/detachment mechanism as claimed in claim 1, wherein the first biasing member comprises a torsion spring pivotally supported about the pivot axis and having one end engaged with the knob and another end engaged with the plunger.

6. The blade attachment/detachment mechanism as claimed in claim 1, wherein the knob is positioned external from the plunger in a direction that is perpendicular to the lengthwise direction of the plunger, the first biasing member being positioned at an interior side of the knob in a direction perpendicular to the lengthwise direction of the plunger and being covered by the knob.

7. The blade attachment/detachment mechanism as claimed in claim 1, wherein the knob comprises an arm portion having a base end pivotally supported about the pivot axis and a free end; and a protrusion protruding from the free end in a direction perpendicular to the lengthwise direction of the plunger and parallel with the pivot axis.

8. The blade attachment/detachment mechanism as claimed in claim 7, wherein the protrusion has a central axis, and wherein a distance between the pivot axis and the central axis is substantially the same or greater than a distance between the pivot axis and a point where the knob acts on the engagement member.

9. The blade attachment/detachment mechanism as claimed in claim 3, further comprising a blade holder provided around the knob and the plunger, the blade holder matching outer contours of the knob and the plunger, the blade holder being formed with a pivot regulating portion that regulates pivoting range of the knob, inner periphery of the blade holder fixing and holding upper and lower surfaces of the blade attachment end portion that are located in the upper and lower slit openings of the slit.

10. The blade attachment/detachment mechanism as claimed in claim 1, wherein the acting surface of the knob comprises a slanted surface that abuts the engagement member, pivoting movement of the knob moving the slanted surface with respect to the engagement member for regulating protruding and retracting action of the engagement member with respect to the blade hole.

11. The blade attachment/detachment mechanism as claimed in claim 10, wherein the engagement member has an abutment surface that abuts the slanted surface of the knob, the abutment surface slanting at a substantially the same angle as a slanting angle of the slanting surface of the knob.

12. The blade attachment/detachment mechanism as claimed in claim 1, wherein the acting surface comprises a plurality of slanting surfaces connected together, the plurality of slanting surfaces having different slanting angles.

13. The blade attachment/detachment mechanism as claimed in claim 12, wherein the plurality of the slanting surfaces of the knob comprise a first slanting surface and a second slanting surface having a slant angle greater than that of the first slanting surface, the engagement member being pressed by the first slanting surface for fixing the blade to the plunger, and the engagement member being released by the second slanting surface for detaching the blade from the plunger.

14. The blade attachmentldetachment mechanism as claimed in claim 9, further comprising a single fastening member extending coaxial with the pivoting axis for supporting the knob and the first biasing member on the plunger, the blade holder being fastened onto the plunger by the single fasting member.

15. The blade attachment/detachment mechanism as claimed in claim 7, further comprising a knob cover that covers the protrusion of the knob, the knob cover being formed from a material with a thermal conductivity lower than that of the knob.

16. The blade attachment/detachment mechanism as claimed in claim 15, further comprising a blade holder provided around the knob and the plunger, the blade holder matching outer contours of the knob and the plunger, the blade holder being formed with an elongated slot through which the protrusion extends for regulating a pivoting range of the protrusion, the knob cover being provided with a flange portion for covering the elongated slot.

17. The blade attachment/detachment mechanism as claimed in claim 16, wherein the knob cover is detachably provided to the protrusion.

18. The blade attachment/detachment mechanism as claimed in claim 17, wherein the knob cover is formed from a resiliently deformable material.

* * * * *